(12) United States Patent
Azuma et al.

(10) Patent No.: US 9,602,220 B2
(45) Date of Patent: Mar. 21, 2017

(54) QUANTUM REPEATER NETWORK SYSTEM (71) Applicants: Nippon Telegraph and Telephone Corporation, Tokyo (JP); The Governing Council of the University of Toronto, Toronto (CA)

(72) Inventors: Koji Azuma, Tokyo (JP); Kiyoshi Tamaki, Tokyo (JP); Hoi-Kwong Lo, Toronto (CA)

(73) Assignees: Nippon Telegraph and Telephone Corporation, Tokyo (JP); The Governing Council of the University of Toronto, Toronto, Ontario ( * ) Notice: Subject to any disclaimer, the term of this patent is extended or adjusted under 35 U.S.C. 154(b) by 405 days.

(21) Appl. No.: 14/301,448

(22) Filed: Jun. 11, 2014

(65) Prior Publication Data
US 2014/0363174 A1 Dec. 11, 2014

(30) Foreign Application Priority Data
Jun. 11, 2013 (JP) .................................. 2013-122792

(51) Int. Cl.
H04B 10/02 (2006.01)
H04B 10/70 (2013.01)
H04L 9/08 (2006.01)

(52) U.S. Cl.
CPC ........... *H04B 10/70* (2013.01); *H04L 9/0855* (2013.01)

(58) Field of Classification Search
CPC .... H04B 10/70; H04B 10/29; H04B 10/2918; H04B 10/2935; H04L 9/0858; H04L 9/0855

(Continued)

(56) References Cited

U.S. PATENT DOCUMENTS

| 7,889,992 B1 | 2/2011 | DiVincenzo et al. |
| 8,135,276 B2 | 3/2012 | Munro et al. |

(Continued)

FOREIGN PATENT DOCUMENTS

| GB | 2470069 A | 11/2010 |
| JP | 2007329865 A | 12/2007 |

(Continued)

OTHER PUBLICATIONS

Official Notice of Rejection dated Jun. 6, 2016; JP2013-122792; 13 pages.

(Continued)

*Primary Examiner* — Hanh Phan
(74) *Attorney, Agent, or Firm* — Fitch, Even, Tabin & Flannery LLP (57) ABSTRACT

The disclosure concerns quantum repeater network system that does not need any matter qubit. According to the quantum repeater network system for performing quantum communication between one transmitter/receiver and the other transmitter/receiver via transmission repeaters and reception repeaters, each of the transmission repeaters prepares quantum systems in an irreducibly entangled state, each of the quantum systems being associated with a reception repeater as a transmission destination, and transmits, to the associated reception repeater, each of the quantum systems in the irreducibly entangled state together with a quantum system entangled with the quantum system.

8 Claims, 7 Drawing Sheets (58) Field of Classification Search
USPC ......... 398/173, 175, 180, 37, 140, 158, 159, 398/177, 176, 178, 64, 179; 380/278, 380/256, 279, 283, 255
See application file for complete search history.

(56) References Cited

U.S. PATENT DOCUMENTS

| | | | |
|---|---|---|---|
| 8,781,334 | B2 | 7/2014 | Munro et al. |
| 9,111,229 | B2 | 8/2015 | Harrison et al. |
| 2008/0089696 | A1 | 4/2008 | Furuta |
| 2009/0317089 | A1 | 12/2009 | Peters et al. |
| 2010/0226659 | A1* | 9/2010 | Nishioka ............... H04L 9/0852 398/154 |
| 2012/0093521 | A1 | 4/2012 | Harrison et al. |
| 2012/0148237 | A1* | 6/2012 | Harrison ............... B82Y 10/00 398/37 |

FOREIGN PATENT DOCUMENTS

| | | |
|---|---|---|
| JP | 2009512238 A | 3/2009 |
| JP | 2012526430 A | 10/2012 |
| JP | 2012531874 A | 12/2012 |
| JP | 2012531875 A | 12/2012 |
| JP | 2012532475 A1 | 12/2012 |
| JP | 2013500530 A | 1/2013 |

OTHER PUBLICATIONS

Briegel et al.; "Quantum Repeaters: the Role of Imperfect Local Operations in Quantum Communication"; Physical Review Letters; vol. 81, No. 26, (Dec. 28, 1998); 4 pages.

Duan, et al.; "Long-distance quantum communication with atomic ensembles and linear optics"; 2001 Macmillian Magazines Ltd; Nature; vol. 414, Nov. 22, 2001; 14 pages.

Sangouard et al.; "Quantum repeaters based on atomic ensembles and linear optics"; Review Modern Physics; vol. 83, Jan.-Mar. 2011; 48 pages.

Childress et al.; "Fault-Tolerant Quantum Communication Based on Solid-State Photon Emitters"; Physical Review Letters; PRL 96, 070504, Feb. 24, 2006; 4 pages.

Van Loock et al.; "Hybrid Quantum Repeater Using Bright Coherent Light"; Physical Review Letters; PRL 96, 240501, Jun. 23, 2006; 4 pages.

Kimble; "The quantum internet"; Insight Review; Nature; vol. 453, Jun. 19, 2008; 8 pages.

Azuma et al.; "Quantum repeaters and computation by a single module: Remote nondestructive parity measurement"; Physical Review; A 85, 062309 (2012); 7 pages.

Zwerger et al.; "Measurement-based quantum repeaters"; Physical Review; A 85, 062326 (2012); 11 pages.

Li et al.; "Fully fault tolerant quantum computation with non-deterministic gates"; arXiv:1008.1369v1 [quant-ph]; Aug. 7, 2010; 5 pages.

Munro et al.; "High-Bandwidth Hybrid Quantum Repeater"; Physical Review Letters; PRL 101, 040502, Jul. 25, 2008; 4 pages.

Munro; et al.; "Quantum communication without the necessity of quantum memories"; Nature Photonics; vol. 6, Oct. 14, 2012; 5 pages.

Knill, et al.; "A scheme for efficient quantum computation with linear optics"; Nature; vol. 409, Jan. 4, 2001; 7 pages.

Raussendorf et al.; "A One-Way Quantum Computer"; Physical Review Letters; vol. 86, No. 22, May 28, 2001; 4 pages.

Varnava et al.; "Loss Tolerance in One-Way Quantum Computation via Counterfactual Error Correction"; Physical Review Letters; PRL 97, 120501, Sep. 22, 2006; 4 pages.

Varnava et al.; "How good must single photon sources and detectors be for efficient linear optical quantum computation?"; Physical Review Letters; vol. 100, 060502, Jul. 20, 2007; 11 pages.

Varnava et al.; "Loss tolerant linear optical quantum memory by measurement-based quantum computing"; New Journal of Physics; vol. 9, 203 (2007); 19 pages.

\* cited by examiner

QUANTUM REPEATER NETWORK SYSTEM

CROSS-REFERENCE TO RELATED APPLICATIONS

This application claims the benefit of Japanese Patent Application No. 2013-122792, filed on Jun. 11, 2013, which is hereby incorporated by reference herein in its entirety.

BACKGROUND OF THE INVENTION

Field of the Invention

The present invention relates to a quantum repeater network system, and more particularly, relates to a quantum repeater network system that employs repeaters to perform efficient quantum communication, regardless of a distance between one transmitter/receiver and the other transmitter/receiver on a network.

Description of the Related Art

Quantum communication technology is the foundation for, for example, quantum cryptography that guarantees the security based on principles of physics, and quantum teleportation used for transferring unknown states. The current quantum communication is performed based on direct transmission of optical pulses between one transmitter/receiver and the other transmitter/receiver. Therefore, as the optical loss in a communication channel between one transmitter/receiver and the other transmitter/receiver exponentially increases with the communication distance, communication resources that compensate for the optical loss would also increase exponentially with the communication distance. Specifically, for transmission of the same amount of information, the exponential increase of the optical loss causes the exponential increase of communication time or the exponential increase of the number of devices additionally provided to compensate for the optical loss. As a result, quantum communication performed based on the direct transmission of optical pulses has a limitation to communication enabled distances. For example, for quantum communication employing the present optical fiber transmission, a communication enabled distance is only about several hundreds of kilometers.

On the other hand, a quantum repeater system is well known as a method for extending a communication enabled distance by increasing the number of communication resources polynomially with the distance (see, for example, "H. J. Briegal et al., Phys. Rev. Lett. 81, 5932 (1998)" and "L. M. Duan, M. D. Lukin, J. I. Cirac and P. Zoller, Nature 414, 413 (2001)"). The quantum repeater system can supply one transmitter/receiver and the other transmitter/receiver with quantum entanglement by employing repeaters located between one transmitter/receiver and the transmitter/receiver.

Figure 1:
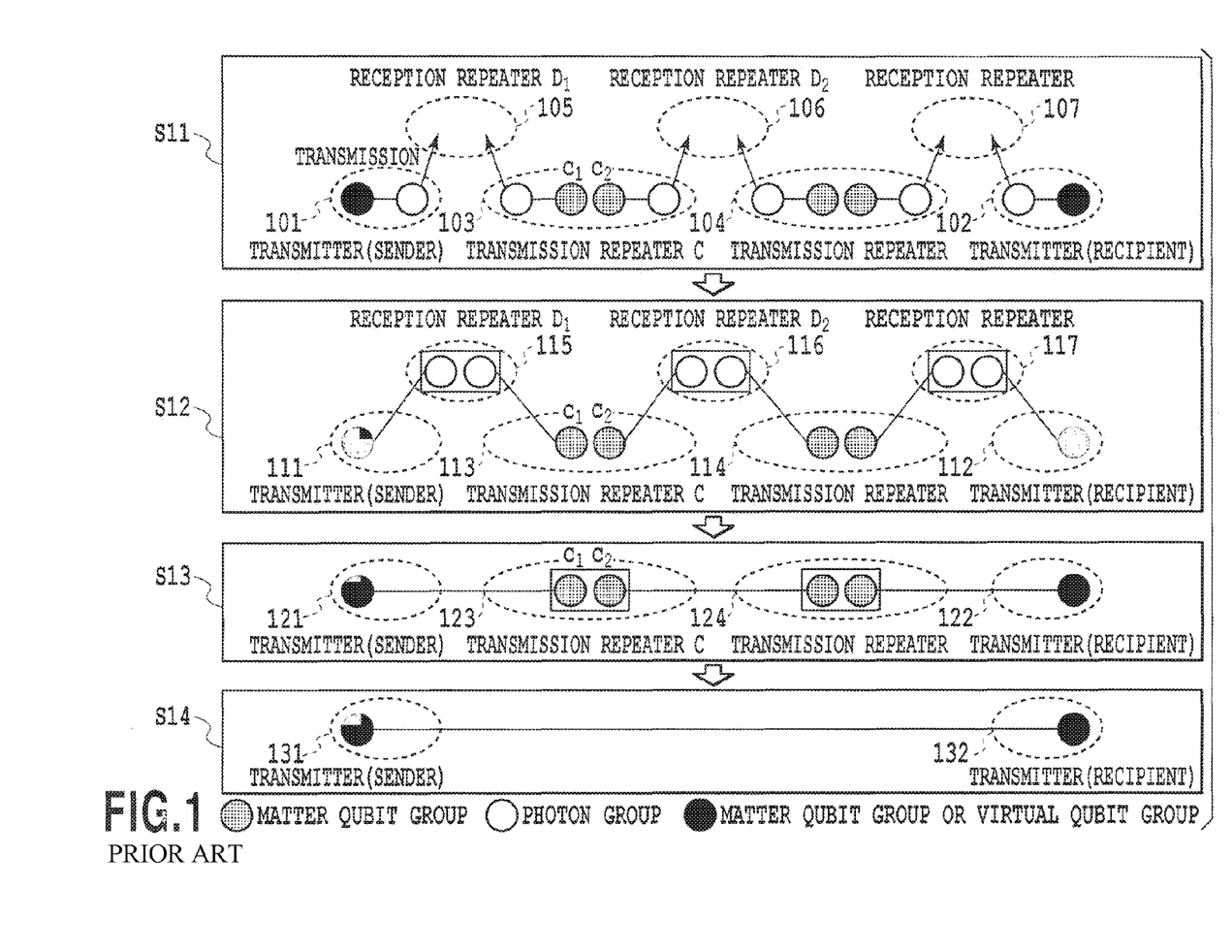
FIG. 1 is a conceptual diagram illustrating a conventional quantum repeater system.

FIG. 1 is a conceptual diagram illustrating a conventional quantum repeater system. As shown at step S11 in FIG. 1, transmission repeaters 103 and 104 and reception repeaters 105, 106 and 107 are alternately arranged between a transmitter/receiver 101 and a transmitter/receiver 102 that are located respectively for a sender and recipient. First, each of the transmission repeaters prepares optical pulses, each of which is in a bi-partite entangled state with a quantum system of the repeater, and then transmits the optical pulses to the adjacent reception repeaters. It should be noted that, at this time, the quantum systems of each repeater are in a separable state. The transmission repeater C103, for example, transmits to the reception repeater $D_1 105$ an optical pulse that is in an entangled state with quantum system $c_1$, and transmits to the reception repeater $D_2 106$ an optical pulse that is in an entangled state with quantum system $c_2$ (step S11). In this case, the quantum system $c_1$ and the quantum system $c_2$ are not in an entangled state, but are in a separable state.

On the other hand, each of the reception repeaters receives the optical pulses from the adjacent transmission repeaters or the transmitter of the adjacent transmitter/receiver, and the performs global measurement (e.g., Bell measurement) on the optical pulses (step S12) so as to make the quantum systems of the adjacent transmission systems in an entangled state (step S13). When the measurement succeeds, the process moves to the following step S13, and when the measurement fails, the process returns to step S11. For example, a reception repeater $D_1 115$ receives, from a transmission repeater C113, an optical pulse that is in an entangled state with the quantum system $c_1$, and receives an optical pulse that is in the entangled state with a quantum system of a transmitter (sender) 111, and then performs global measurement (Bell measurement) for the received optical pulses (step S12).

Then, each of the transmission repeaters confirms that the quantum systems of the transmission repeater are in an entangled state with the quantum systems of the other transmission repeaters, and thereafter, performs global measurement (Bell measurement) for the quantum systems of the transmission repeater (step S13). For example, when both of reception repeaters $D_1 115$ and $D_2 116$ adjacent to the transmission repeater C123 have successfully performed the global measurement (step S12), since the quantum system $c_1$ of the transmission repeater C123 and a quantum system of a transmitter (sender) 121 have quantum entanglement, and since the quantum system $c_2$ of the transmitter repeater C123 and a quantum system of a transmission repeater 124 have quantum entanglement, the transmission repeater C123 performs global measurement on the remaining quantum systems $c_1$ and $c_2$ (step S13). The process of step S13 is sequentially performed by the transmission repeaters, and when all of the transmission repeaters have completed this process, quantum entanglement is supplied to a transmitter/receiver 131 and a transmitter/receiver 132 (step S14).

In order to provide such a quantum repeater system, typically, as described in the following reference documents, the transmission repeater necessitates matter qubits, such as the quantum system $c_1$ and $c_2$ in the above described example, that can interact with an optical pulse (request 1) and that can store quantum information in a long period of time (request 2; i.e., a memory function for quantum information). In addition to reference documents by "Briegel" and "Duan" previously described, there are other reference documents: "N. Sangouard et al., Rev. Mod. Phys. 83, 33 (2011)", "L. Childress et al., Phys. Rev. Lett. 96, 070504 (2006)", "P. van Loock et al., Phys. Rev. Lett. 96, 240501 (2006)", "H. J. Kimbic, Nature 453, 1023 (2008)", "K. Azuma et al., Phys. Rev. A 85, 062309 (2012)", "M. Zwerger, W. Dür and H. J. Briegel, Phys. Rev. A 85, 062326 (2012)", "Y. Li, S. D. Barrett, T. M. Stace, and S. C. Benjamin, arXiv:1008.1369", and "W. J. Munro, R. V. Meter, S. G. R. Louis, and K. Nemoto, Phys. Rev. Lett. 101, 040502 (2008)".

In another reference document, "W. J. Munro, A. M. Stephens, S. J. Devitt, K. A. Harrison, and K. Nemoto, Nature Photon. 6, 777 (2012)", it is argued that so long as a very efficient single-photon source can be employed (request 3) and an efficient CZ gate between a matter qubit and single photon as request 1 described above is available, the quantum-memory function as in request 2 is not necessary.

However, for all of the conventional quantum repeater systems, matter qubits with high functionality are indispensable components.

SUMMARY OF THE INVENTION

Embodiments of the present invention provide a quantum repeater network system that does not need any matter qubit, or a quantum repeater network system that can be configured by matter qubits with low functionality alone.

A first embodiment provides a quantum repeater network system for performing quantum communication between one transmitter/receiver and the other transmitter/receiver via transmission repeaters and reception repeaters, wherein a transmitter of the transmitter/receiver includes (a) a unit for transmitting quantum systems to reception repeaters as transmission destinations, wherein each of transmission repeaters includes: (b1) a unit for preparing quantum systems in an irreducibly entangled state, each of said quantum systems being associated with a reception repeater as a transmission destination; and (b2) a unit for transmitting, to the associated reception repeater, each of the quantum systems in the irreducibly entangled state together with a quantum system entangled with the quantum system, and wherein each of reception repeaters includes: (c1) a unit for receiving quantum systems transmitted by transmitters/receivers communicating with the reception repeater and by transmission repeaters communicating with the reception repeater; (c2) a measurement device for measuring the quantum systems received; and (c3) a unit for transmitting measurement outcomes to transmitter/receivers.

According to the first embodiment, since the transmission repeater creates, in advance, an irreducibly entangled state for quantum systems that are associated with the transmission destinations, global measurement for the quantum systems is not required, and the quantum systems can thus be transmitted to the transmission destinations. Therefore, a quantum repeater network system that does not require matter qubits and performs communication based on Photons alone can be configured.

A second embodiment provides a quantum repeater network system for performing quantum communication between one transmitter/receiver and the other transmitter/receiver via transmission repeaters and reception repeaters, wherein a transmitter of the transmitter/receiver includes (a) a unit for transmitting quantum systems to reception repeaters as transmission destinations, wherein each of transmission repeaters includes: (b1) a unit for preparing quantum systems in an irreducibly entangled state, each of said quantum systems being associated with a reception repeater as a transmission destination; (b2) a unit for transmitting quantum systems which are respectively entangled with the quantum systems, in the irreducibly entangled state, to the associated reception repeaters, respectively; (b3) a measurement device for performing measurement on the quantum systems in the irreducibly entangle state, in accordance with measurement outcomes received from the reception repeaters as the transmission destinations; and (b4) a unit for transmitting measurement outcomes to transmitters/receivers, and wherein each of reception repeaters includes: (c1) a unit for receiving quantum systems transmitted by transmitters/receivers communication with the reception repeater and by transmission repeaters communicating with the reception repeater; (c2) a measurement device for measuring the quantum systems received; and (c3) a unit for transmitting measurement outcomes to transmitters/receivers and the transmission repeaters as transmission sources.

According to the second embodiment, since the transmission repeater creates, in advance, an irreducibly entangled state for quantum systems that are respectively associated with the transmission destinations, global measurement for the quantum systems is not required. Therefore, even in a case wherein matter qubits that are not appropriate for transmission and have only probabilistic global measurement and operations are used as the quantum systems of the transmission repeater that are associated with transmission destinations, since the second embodiment allows the matter qubits to be designated to have a short period for keeping quantum information, a quantum repeater network system using such matter qubits with low functionality can be configured.

Further features of the present invention will become apparent from the following description of exemplary embodiments (with reference to the attached drawings).

DESCRIPTION OF THE EMBODIMENTS

The embodiments of the present invention will now be described in detail while referring to drawings. It is assumed that users aim to perform quantum communication by employing transmitters/receivers (a transmitter and a receiver) $\{C_j\}_{j \in U}$ of the users and reception repeaters $\{C_j\}_{j \in U}$ and transmission repeaters $\{C_j\}_{j \in S}$, both of which serve as repeaters. It should be noted that the family of sets U, D and S is pairwise disjoint. Here, each repeater $C_1$ has direct communication parties and the set of these communication parties is represented as S(j).

According to the conventional method, transmission repeater $C_k$ (k∈S) prepares quantum systems $\{C_{jik}\}_{j \in S(k)}$ associated with transmission destination j∈S(k), independently, and transmits, to transmission destination j, quantum system $C_{k \to j}$ that is in an entangled state with quantum system $C_{j|k}$. Reception repeater $C_l$ (l∈D) receives quantum systems $\{C_{i \to l}\}_{i \in S(l)}$ from i∈S(l), and performs global measurement for the quantum systems $\{C_{i \to l}\}_{i \in S(l)}$ and returns the measurement outcomes to transmission source i. at the final step, based on the measurement outcomes received, transmission source i performs global measurement for quantum systems $\{C_{l|i}\}_{l \in S(i)}$, and thereby, supplies quantum entanglement to transmitters/receivers of users.

By contrast, in the embodiments, transmission repeater $C_k$ (k∈S) does not independently prepares quantum systems $\{c_{j|k}\}_{j \in S(k)}$ associated with the transmission destinations j∈S (k), but prepares these quantum systems in an irreducibly entangled state, and thereafter begins the quantum repeaters communication. That is, since an irreducibly entangled state is generated for the quantum systems $\{c_{j|k}\}_{j\in S(k)}$ in advance, global measurement on the quantum systems $\{c_{j|k}\}_{j\in S(k)}$, which is required as the final step for the conventional method, is not necessary. As a result, quantum system $c_{j|k}$ can also be transmitted to the transmission destination $j\in S(k)$.

Thanks to this advantage, as described in a first embodiment of this invention below, transmission of quantum systems $\{c_{j|k}\}_{j\in S(k)}$ is enabled, and a quantum repeater network system can thus be performed with photons alone and without matter qubits. Furthermore, as described in a second embodiment of this invention below, even in a case wherein quantum systems $\{c_{j|k}\}_{j\in S(k)}$ are composed of matter qubits that are not appropriate for transmission and have only probabilistic global measurement and operations, there is another advantage that memory time of quantum information required for the matter qubits can be reduced, compared with the conventional method, down to a period about equivalent to communication time for the nearest neighbor repeaters.

These two embodiments will now be more specifically described.

First Embodiment

Figure 2:
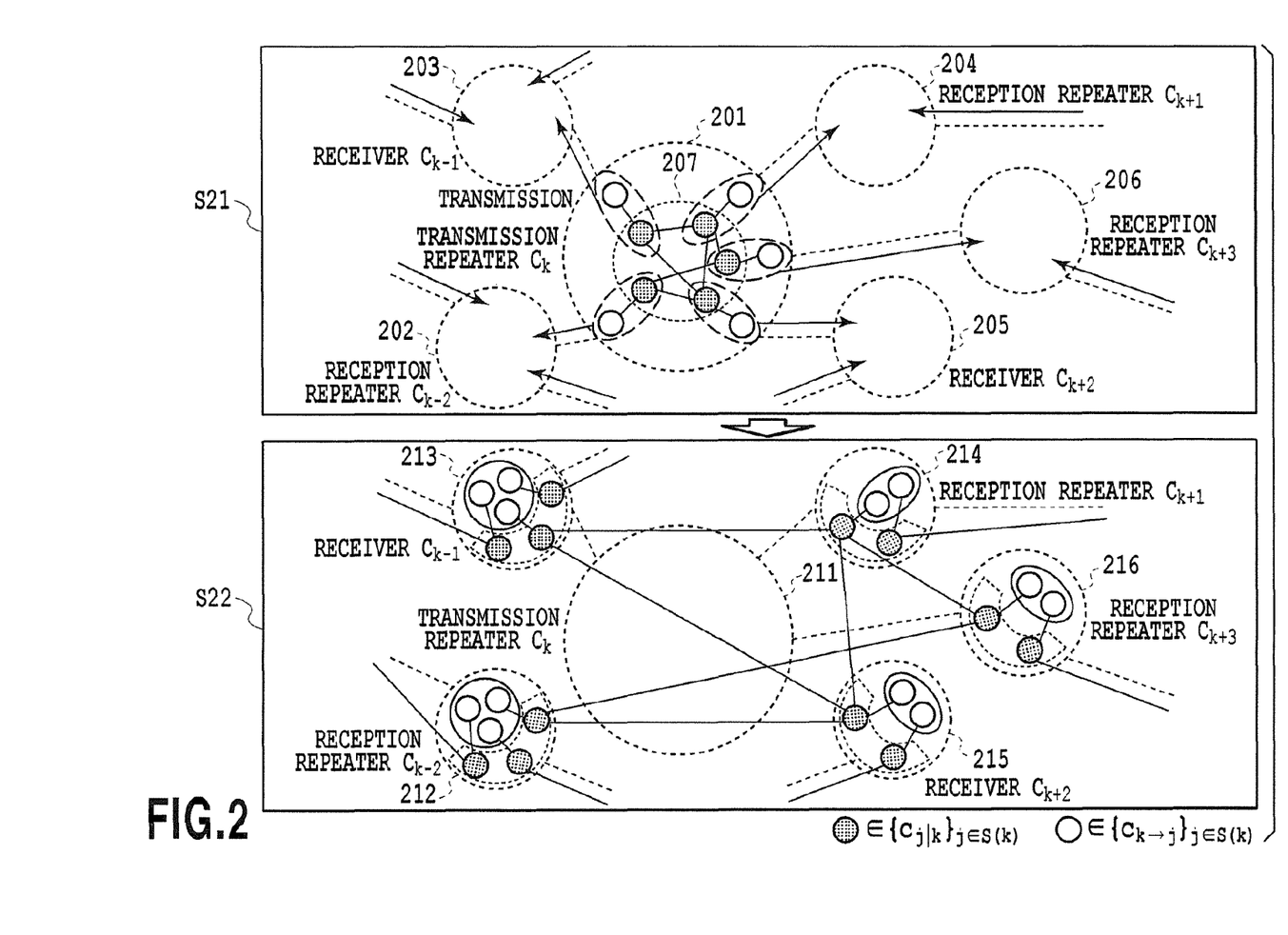
FIG. 2 is a conceptual diagram illustrating the arrangement for transmission repeaters according to a first embodiment of the present invention.

FIG. 2 shows the configuration of a transmission repeater according to the first embodiment of this invention. As represented at step S21 in FIG. 2, transmission repeater $C_k$ ($k\in S$) 201 prepares an irreducibly entangles state for quantum systems $\{c_{j|k}\}_{j\in S(k)}$ 207 that are respectively associated with transmission destination $j\in S(k)$. Then, transmission repeater $C_k(k\in S)$ 201 prepares quantum systems $\{c_{k\to j}\}$ that are respectively entangled with quantum systems $\{c_{j|k}\}_{j\in S(k)}$ 207 in the irreducibly entangled state (i.e., $c_{j|k}$ and $c_{k\to j}$ are entangled), and then transmits to transmission destination j, not only quantum system $c_{k\to j}$, but also quantum system $c_{j|k}$.

As represented at step S22 in FIG. 2, reception repeater $C_l$ ($l\in D$) receives quantum systems $\{c_{i\to l}\}_{i\in S(l)}$ and quantum systems $\{c_{l|i}\}_{i\in S(l)}$ from $i\in S(l)$, and performs global measurement on quantum systems $\{c_{i\to l}\}_{i\in S(l)}$. Based on the measurement outcomes, measurement on quantum systems $\{c_{l|i}\}_{i\in S(l)}$ is performed to supply quantum entanglement to the transmitters/receivers of the users.

Second Embodiment

Figure 3:
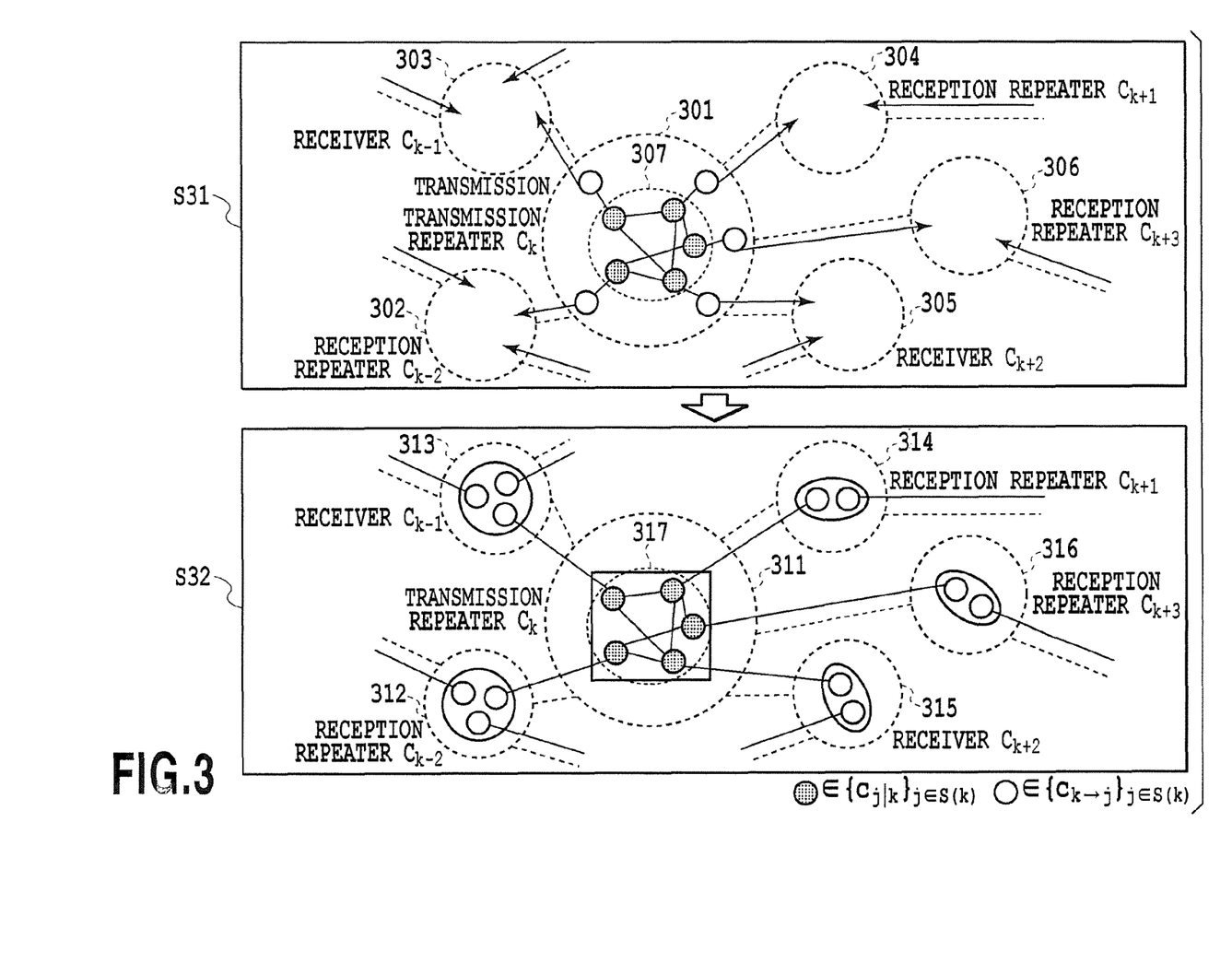
FIG. 3 is a conceptual diagram illustrating the arrangement for transmission repeaters according to a second embodiment of the present invention.

FIG. 3 shows the configuration of a transmission repeater according to the second embodiment of this invention. As represented at step S31 in FIG. 3, transmission repeater $C_k$ ($k\in S$) 301 prepares an irreducibly entangled state for quantum systems $\{c_{j|k}\}_{j\in S(k)}$ that are respectively associated with transmission destinations $j\in S(k)$. Then, transmission repeater $C_k$ ($k\in S$) 301 prepares quantum systems $\{c_{k\to j}\}$ that are respectively entangled with quantum systems $\{c_{j|k}\}_{j\in S(k)}$ 307 in the irreducibly entangled state (i.e., $c_{j|k}$ and $c_{k\to j}$ are entangled), and then transmits quantum system $c_{k\to j}$ to transmission destination j.

As represented at step S32 in FIG. 3, reception repeater $C_l$ ($l\in D$) receives quantum systems $\{c_{i\to l}\}_{i\in S(l)}$ from $i\in S(l)$, performs global measurement for quantum systems $\{c_{i\to l}\}_{i\in S(l)}$, and returns the measurement outcomes to transmission source i. Based on the received measurement outcomes, transmission source i performs measurement on quantum system $\{c_{l|i}\}_{i\in S(l)}$ to supply quantum entanglement to the transmitters/receivers of the users. For example, at step S32 in FIG. 3, based on the measurement outcomes received from transmission destination $j\in S(k)$ 312 to 316, transmission repeater $C_k$ ($k\in S$) 311 performs measurement on quantum systems $\{c_{j|k}\}_{j\in S(k)}$ 317.

Quantum repeater network systems that are configured without many matter qubit and based on photons will be described as specific examples for the embodiments of the present invention. Examples 1 and 2 correspond to the first embodiment, and Example 3 corresponds to the second embodiment. Example 4 is provided in order to clearly identify the Applicable range for the present invention.

Example 1

Figure 5:
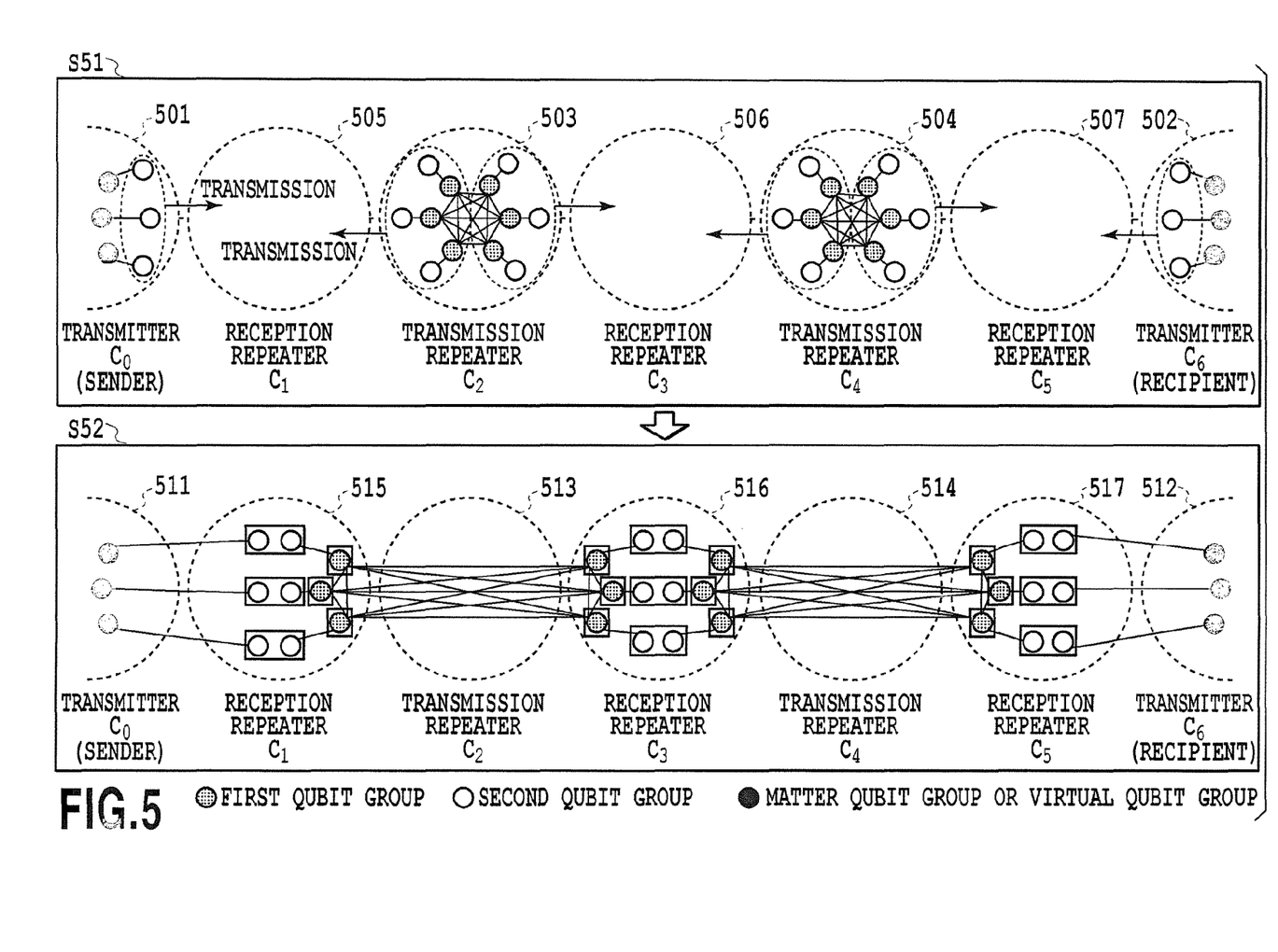
FIG. 5 is a conceptual diagram illustrating a quantum repeater system according to Example 1.

FIG. 5 depicts a quantum repeater system according to Example 1. The system in this Example focuses on a one-dimensional network; however, it is apparent that this system can be extended to a general network. As represented at step S51 in FIG. 5, transmission repeaters 503 and 504 and reception repeaters 505 to 507 are alternately arranged between a transmitter/receiver 501 for a send and a transmitter/receiver 502 for a recipient. The repeaters are respectively called $\{C_i\}_{i=1, 2, \ldots, 2n-1}$ from the sender to the recipient. Specifically, repeater $C_{2i}$ (i=1, 2, . . . , n−1) corresponds to a transmission repeater and repeater $C_{2j+1}$ (j=0, 1, 2, . . . , n−1) corresponds to a reception repeater. The sender has a transmitter $C_0$, while the recipient has a transmitter $C_{2n}$. Further, it is supposed that all the qubits to be described below are composed of single photons.

Figure 4:
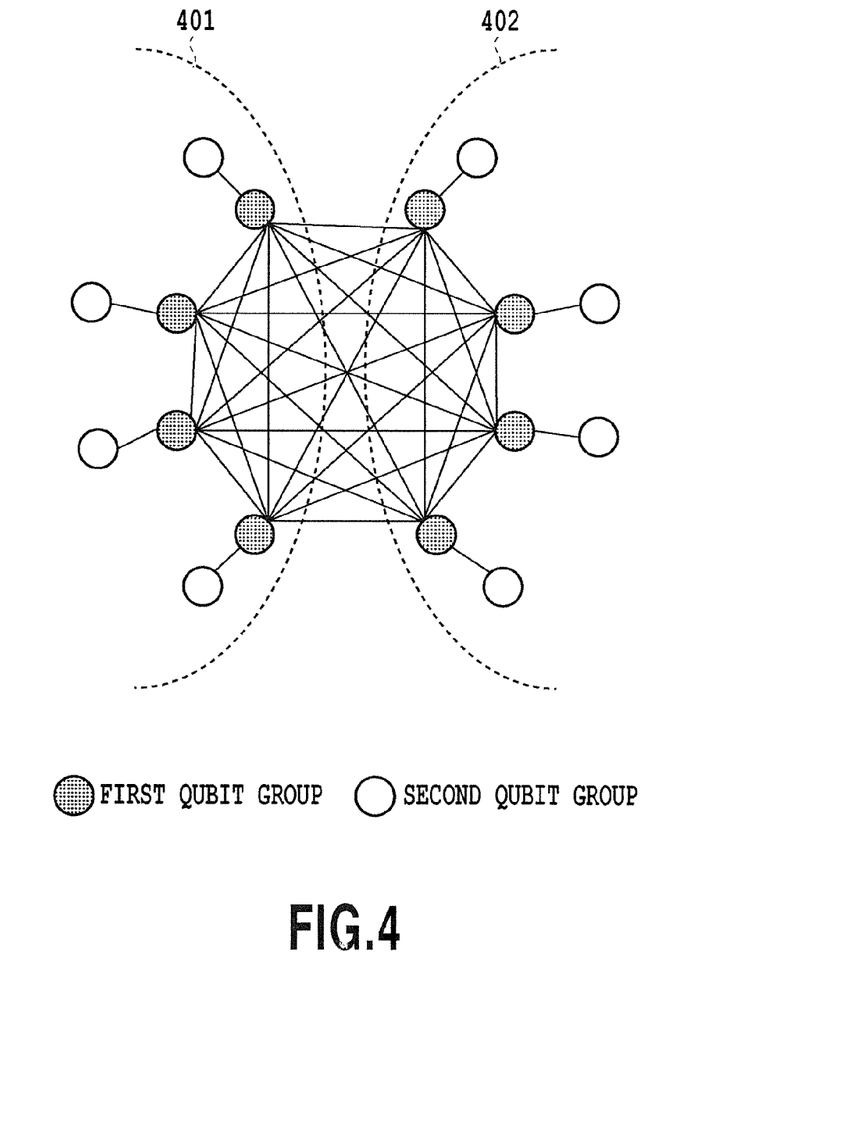
FIG. 4 is a graph showing quantum systems formed in an irreducibly entangled state by a transmission repeater.

Transmission repeater $C_{2i}$ (i=1, 2, . . . , n−1) prepares, for single photons, a cluster state $|G_c^m\rangle$ shaped like a graph shown in FIG. 4. In the graph in FIG. 4, circles (vertexes) correspond to qubits, and lines (edges) that connect qubits represent that these qubits prepared in the state $$(|0\rangle + |1\rangle)/\sqrt{2}$$ [Expression 1]

have been subjected to the CZ gate. Here, the set of $|0\rangle$ and $|1\rangle$ is the computational basis. As shown in FIG. 4, $|G_c^m\rangle$ has 2m (m=1, 2, 3, . . . ) arms, each of which is composed of a first qubit and a second qubit. The set 401 of qubits on m left arms is associated with adjacent reception repeaters $C_{2i-1}$, and the set 402 of qubits on m right arms is associated with adjacent reception repeater $C_{2i+1}$. More specifically, the first qubits on the left arms are associated with reception repeater $C_{2i-1}$, while the first qubits on the right arms are associated with reception repeater $C_{2i+1}$, and the first qubits and the second qubits are respectively entangled. Therefore, it is clear that, as shown in the graph in FIG. 4, the quantum systems associated with the adjacent reception repeaters are provided in an irreducibly entangled state (the cluster state, in this example) in advance by transmission repeater $C_{2i}$.

There is also a case wherein encoding based on a quantum error-correcting code is performed for qubits in order to remove the effect of photon losses during transmission and the other practical noise. In such a case, by regarding qubits described below as encoded qubits, the quantum repeater network system works as a quantum communication network system that is resistant to photon losses and noise.

First, transmission repeater $C_{2i}$ transmits single photons on the left arms of state $|G_c^m\rangle$ to adjacent reception repeater $C_{2i-1}$, and single photons on the right arms to adjacent reception repeater $C_{2i+1}$ (step S51). At the same time, transmitter $C_0$ of the transmitter/receiver 501 is employed to transmit, to reception repeater $C_1$ 505, m single photons entangled with a quantum system A of a sender (m single photons prepared in accordance with a random number A provided by the sender in a case where in quantum key distribution is performed). Furthermore, transmitter $C_{2n}$ of the transmitter/receiver 502 is employed to transmit, to reception repeater $C_{2n-1}$ 507, m single photons that are entangled with a quantum system B of a recipient (m single photons prepared in accordance with a random number B provided by the recipient in a case wherein quantum key distribution is performed) (step S51).

Reception repeater $C_{2j+1}$ receives single photons on m right arms transmitted by transmission repeater $C_{2j}$ (m single photons from transmitter $C_0$ of the transmitter/receiver 511 in the case of reception repeater $C_1$ 515), and received single photons on m left arms transmitted by transmission repeater $C_{2j+2}$ (m single photons from transmitter $C_{2n}$ of the transmitter/receiver 512 in the case of reception repeater $C_{2n-1}$ 517). The reception repeater $C_{2j+1}$ associates the right arms with the left arms, respectively, and performs Bell measurement on every pair of a second qubit on a right arm (a single-photon qubit in the case of reception repeater $C_1$ 515) and the second qubit on the associated left arm (a single-photon qubit in the case of reception repeater $C_{2n-1}$ 517) (step S52).

It should be noted that the Bell measurement performed here has a role of executing the CZ gate followed by the measurement in X-basis.

$$\{(|0\rangle \pm |1\rangle)/\sqrt{2}\} \qquad \text{[Expression 2]}$$

on each of qubits in a case where the Bell measurement is successful. If the Bell measurement even for one pair of the right and left arms is successful, reception repeater $C_{2j+1}$ selects the arm pair for which the Bell measurement has been correctly performed, and performs the X-basis measurement for the first qubits on the selected left and right arms. for the first qubits of the other m−1 pairs, the reception repeater $C_{2j+1}$ performs measurement in Z-basis $$\{|0\rangle, |1\rangle\} \qquad \text{[Expression 3]}$$

and transmits all of the measurement outcomes to the sender and the recipient. In a case wherein the Bell measurement has failed for all the second qubits, or wherein the measurement has not been successful for all of the first qubits, reception repeater $C_{2j+1}$ transmits the measurement outcome representing "failure" to the sender and the recipient. In a case wherein none of the reception repeaters $\{C_{2j+1}\}_{j=0, 1, \ldots, n-1}$ returns the "failure" as the measurement outcome, the quantum repeater communication is successful, and an entangled state between quantum systems A of the sender and B of the recipient is thus established (in the case of quantum key distribution is performed, the random numbers A and B are candidates of a shifted key).

Example 2

In Example 1, the system wherein the sender and the recipient employ transmitters to perform quantum communication has been provided. In Example 2, instead of transmitters, a sender and a recipient can employ a type of receivers to operate a quantum communication system as in Example 1. Therefore, in addition to Example 1, it is not essential whether a user should have a transmitter or a receiver, and the embodiment is effective even for a case wherein there are not only users having a transmitter but also users having a receiver on a network.

Figure 6:
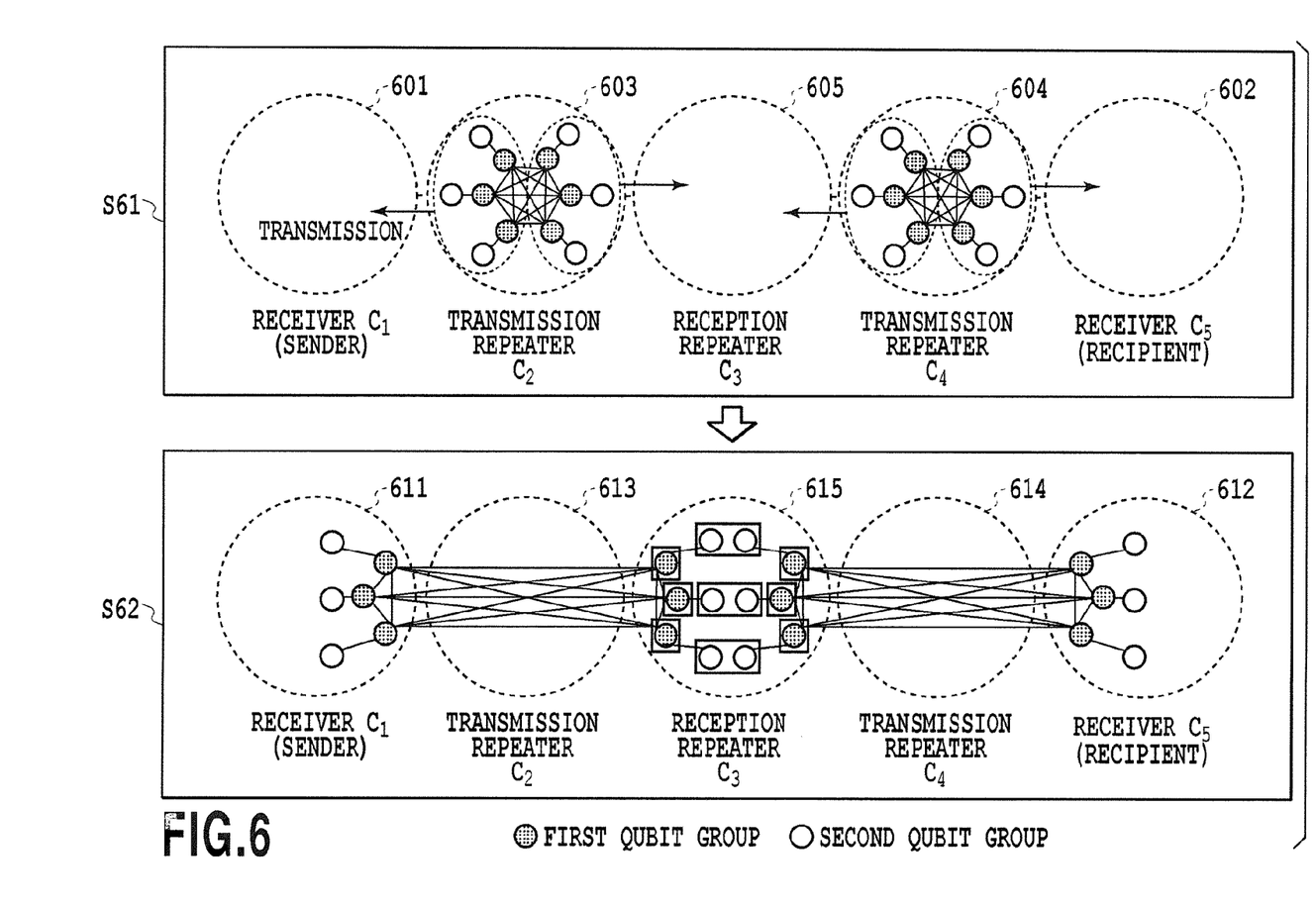
FIG. 6 is a conceptual diagram illustrating a quantum repeater system according to Example 2.

FIG. 6 depicts a quantum repeater system according to Example 2. Similarly to Example 1, transmission repeaters 603 and 604 and a reception repeater 605 are alternately arranged between a transmitter/receiver 601 for a sender and a transmitter/receiver 602 for a recipient (step S61). The transmitter/receiver 601 of the sender includes a receiver $C_1$, and the transmitter/receiver 602 of the recipient includes a receiver $C_{2n+1}$. The repeaters $\{C_i\}_{i=2, \ldots, 2n}$ are located between the sender and the recipient, and repeater $C_{2i}$ (i=1, ..., n) corresponds to a transmission repeater, and repeater $C_{2j+1}$ (j=1, 2, ..., n−1) corresponds to a reception repeater. Further, similarly to Example 1, the transmission repeater $C_{2i}$ prepares, for single photons, cluster state $|G_c^m\rangle$ shaped like a graph shown in FIG. 4.

First, the transmission repeater $C_{2i}$ transmits single photons on the left arms of state $|G_c^m\rangle$ to adjacent reception repeater $C_{2i-1}$ (receiver $C_1$ of the sender in the case of transmission repeater $C_2$ 603), and single photons on the right arms to the adjacent reception repeater $C_{2i+1}$ (receiver $C_{2n+1}$ of the recipient in the case of transmission repeater $C_{2n}$) (step S61). The transmitter/receiver 601 of the send keeps, as a quantum system A to be employed to share quantum entanglement, the photons received from transmission repeater $C_2$ 603 (in a case wherein quantum key distribution is performed, the received photons are measured, and the measurement outcomes are stored as candidates of a shifted key). The transmitter/receiver 602 of the recipient keeps, as a quantum system B to be employed to share quantum entanglement, the photons received from transmission repeater $C_{2n}$ 604 (in a case wherein quantum key distribution is performed, the received photons are measured, and the measurement outcomes are stored as candidates of a shifted key) (step S61).

Reception repeater $C_{2j+1}$ receives single photons on m right arms transmitted by transmission repeater $C_{2j}$, and receives single photons on m left arms transmitted by transmission repeater $C_{2j+2}$. The reception repeater $C_{2j+1}$ associates the right arms with the left arms, respectively, and performs Bell measurement on every pair of second qubit on a right arm and the second qubit on the associated left arm (step S62).

It should be noted that the Bell measurement performed here has a role of executing the CZ gate followed by X-basis measurement on each of the qubits in a case wherein the Bell measurement is successful. If the Bell measurement is successful even for one pair of the right and left arms, reception repeater $C_{2j+1}$ selects the arm pair for which the Bell measurement has been correctly performed, and performs the X-basis measurement for the first qubits of the selected left and right arms. For the first qubits of the other m−1 arm pairs, the reception repeater $C_{2j+1}$ performs the Z-basis measurement, and transmits all of the measurement outcomes to the sender and the recipient.

In a case wherein the Bell measurement has failed for all the second qubits, or wherein the measurement has not been successful for all of the first qubits, reception repeater $C_{2j+1}$ transmits the measurement outcome representing "failure" to the sender and the recipient. In a case wherein none of the reception repeaters $\{C_{2j|i}\}_{j=0, 1, \ldots, n-1}$ returns the "failure" as the measurement outcome, the quantum repeater communication is successful, and an entangled state of the quantum systems A of the sender and B of the recipient is thus established (in the case of quantum key distribution is performed, the random numbers A and B are candidates of a shifted key).

Example 3

The quantum repeater network system based on only photons has been employed for Examples 1 and 2. The embodiment has an additional advantage that, even in a case wherein quantum repeater communication is performed based on matter qubits, requirements for matter qubits can be eased. A quantum repeater network system based on matter qubits will now be described according to Example 3.

Figure 7:
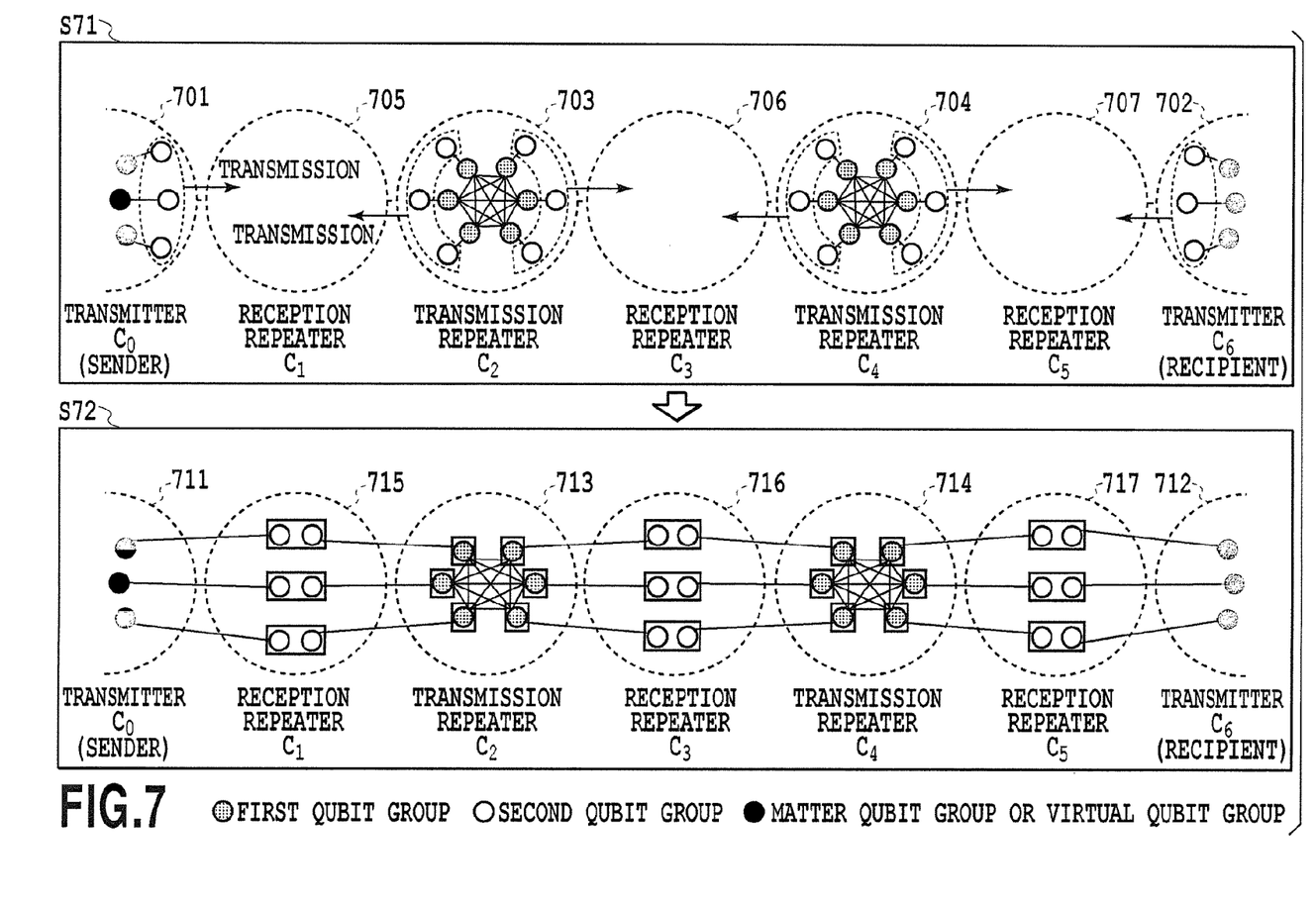
FIG. 7 is a conceptual diagram illustrating a quantum repeater system according to Example 3.

A quantum repeater system according to Example 3 is shown in FIG. 7. Similarly to Example 1, transmission repeaters 703 and 704 and reception repeaters 705 to 707 are alternately arranged between a transmitter/receiver 701 for a sender and a transmitter/receiver 702 for a recipient (step S71). The transmitter/receiver 701 of the sender includes a transmitter $C_0$, and the transmitter/receiver 702 of the recipient includes a transmitter $C_{2n}$. The repeaters $\{C_i|_{i=1, 2, \ldots, 2n-1}$ are located between the sender and the recipient, and repeater $C_{2j}$ (i=1, 2, ..., n−1) corresponds to a transmission repeater, and repeater $C_{2j+1}$ (j=0, 1, 2, ..., n−1) corresponds to a reception repeater.

For simplicity, it is supposed that for this Example, users perform communication based on transmitters. However, as apparent from Example 2, the network system provided by this Example can work in the same manner, regardless of a case wherein the users employ receivers instead of transmitters, or a case wherein there are both users having a transmitter and users having a receiver on the network. It should be noted, however, that in Example 3, unlike Examples 1 and 2, the first qubits are matter qubits and the second qubits are photons as constituents for the cluster state $|G_c^m\rangle$ that is prepared by transmission repeater $C_{2i}$ (i=1, 2, ..., n−1).

First, among the matter qubits and photons prepared in $|G_c^m\rangle$, transmission repeater $C_{2i}$ transmits the second qubits (photons) on the left arms to adjacent reception repeater $C_{2i-1}$, and transmits the second qubits (photons) on the right arms to adjacent reception repeater $C_{2i+1}$ (step S71). At the same time, transmitter $C_0$ of the transmitter/receiver 701 is employed to transmit, to reception repeater $C_1$ 705, m photons entangled with a quantum system A of a sender (m photons prepared in accordance with a random number A provided by the sender in a case wherein quantum key distribution is performed). Furthermore, transmitter $C_{2n}$ of the transmitter/receiver 702 is employed to transmit, to reception repeater $C_{2n-1}$ 707, m photons entangled with a quantum system B of a recipient (m photons prepared in accordance with a random number B provided by the recipient in as case wherein quantum key distribution is performed) (step S71).

Reception repeater $C_{2j+1}$ receives photons on m right arms transmitted by transmission repeater $C_{2j}$ (m photons from transmitter $C_0$ of the transmitter/receiver 711 in the case of reception repeater $C_1$ 715), and receives photons on m left arms transmitted by transmission repeater $C_{2j+2}$ (m photons from transmitter $C_{2n}$ of the transmitter/receiver 712 in the case of reception repeater $C_{2n-1}$ 717). The reception repeater $C_{2j+1}$ associates the right arms with the left arms, respectively, and performs Bell measurement on every pair of a second qubit on a right arm (a single-photon qubit in the case of reception repeater $C_1$ 715) and the second qubit on the associated left arm (a single-photon qubit in the case of reception repeater $C_{2n-1}$ 717) (step S72).

It should be noted that the Bell measurement performed here has a role of executing the CZ gate followed by X-basis measurement on each of the qubits in a case wherein the Bell measurement is successful. If the Bell measurement is successful even for one pair of the right and left arms, reception repeater $C_{2j+1}$ selects the arm pair for which the Bell measurement has been correctly performed, and transmits an execution instruction to perform the X-basis measurement for the first qubits on the selected arms to trans-mission repeater $C_{2j}$ and transmission repeater $C_{2j+2}$. For the other m−1 arm pairs, the reception repeater $C_{2j+1}$ transmits, to the transmission repeater $C_{2j}$ and the transmission repeater $C_{2j+2}$, an execution instruction to perform the Z-basis measurement for the first qubits of the right arms of transmission repeater $C_2$ and the first qubits of the left arms of the transmission repeater $C_{2j-2}$. Transmission repeater $C_{2j}$ and transmission repeater $C_{2j+2}$ transmit the measurement outcomes to the sender and the recipient.

In a case wherein the Bell measurement has failed for all the second qubits held by reception repeater $C_{2j+1}$, or wherein transmission repeater $C_{2j}$ and transmission repeater $C_{2j+2}$ have not succeeded in the measurement for all of the first qubits as instructed, the transmission repeater $C_{2j}$ and the transmission repeater $C_{2j+2}$ transmit the measurement outcomes representing "failure" to the sender and the recipient. In a case wherein none of the transmission repeaters $\{C_{2j}\}_{j=1, \ldots, n-1}$ returns the "failure" as the measurement outcome, the quantum repeater communication is successful, and an entangle state of the quantum systems A of the sender and B of the recipient is thus established (in the case of quantum key distribution is performed, the random numbers A and B are candidates of a shifted key).

Example 4

According to Example 1, 2 and 3, the sender has a quantum system A and the recipient has a quantum system B, and eventually, in a case wherein the quantum repeater communication is successful, an entangled state for the quantum systems A and B is established. The quantum entanglement of the quantum systems A and B may be measured and employed by the sender and the recipient immediately after the entanglement has been created, or may be employed later by performing global operation together with the other quantum systems owned by the sender and the recipient. That is, the way of employing the quantum entanglement obtained in the above described embodiments differs depending on applications to be implemented, and in accordance with the application to be implemented, there is a wide selection for devices for a sender and a recipient, or for the roles of devices. However, the essential feature for the embodiments is to efficiently supply, to the sender and the recipient, quantum entanglement that serves as the resources for all types of quantum communications, and regardless of devices owned by senders and recipients and the roles of the devices, all types of quantum communications performed based on quantum entanglements obtained by the embodiments of the present invention are included in Examples of this invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. A quantum repeater network system for performing quantum communication between one transmitter/receiver and the other transmitter/receiver via transmission repeaters and reception repeaters,
wherein a transmitter of the transmitter/receiver includes
(a) a unit for transmitting quantum systems to reception repeaters as transmission destinations, wherein each of transmission repeaters includes:
(b1) a unit for preparing quantum systems in an irreducibly entangled state, each of said quantum systems being associated with a reception repeater as a transmission destination; and
(b2) a unit for transmitting, to the associated reception repeater, each of the quantum systems in the irreducibly entangled state together with a quantum system entangle with the quantum system, and wherein each of reception repeaters includes:
(c1) a unit for receiving quantum systems transmitted by transmitters/receivers communicating with the reception repeater and by transmission repeaters communicating with the reception repeater;
(c2) a measurement device for measuring the quantum systems received; and
(c3) a unit for transmitting measurement outcomes to transmitters/receivers.

2. A quantum repeater network system for performing quantum communication between one transmitter/receiver and the other transmitter/receiver via transmission repeaters and reception repeaters, wherein a receiver of the transmitter/receiver includes:
(a1) a unit for receiving quantum systems transmitted by transmission repeaters communicating with the transmitter/receiver;
(a2) a measurement device for performing measurement for the received quantum systems; and
(a3) a unit for transmitting measurement outcomes to different transmitters/receivers, wherein each of transmission repeaters includes:
(b1) a unit for preparing quantum systems in an irreducibly entangled state, each of said quantum systems being associated with a transmitter/receiver or a reception repeater as a transmission destination; and
(b2) a unit for transmitting, to the associated transmitter/receiver or the associated reception repeater, each of the quantum systems in the irreducibly entangled state together with a quantum system entangled with the quantum system, and wherein each of reception repeaters includes:
(c1) a unit for receiving quantum systems transmitted by the transmission repeaters communicating with the reception repeater;
(c2) a measurement device for measuring the quantum systems received; and
(c3) a unit for transmitting measurement outcomes to transmitters/receivers.

3. A quantum repeater network system for performing quantum communication between one transmitter/receiver and the other transmitter/receiver via transmission repeaters and reception repeaters, wherein a transmitter of the transmitter/receiver includes
(a) a unit for transmitting quantum systems to reception repeaters as transmission destinations, wherein each of transmission repeaters includes:
(b1) a unit for preparing quantum systems in an irreducibly entangled state, each of said quantum systems being associated with a reception repeater as a transmission destination;
(b2) a unit for transmitting quantum systems, which are respectively entangled with the quantum systems in the irreducibly entangled state, to the associated reception repeaters, respectively;
(b3) a measurement device for performing measurement on the quantum systems in the irreducibly entangled state, in accordance with measurement outcomes received from the reception repeaters as the transmission destinations; and
(b4) a unit for transmitting measurement outcomes to transmitters/receivers, and wherein each of reception repeaters includes:
(c1) a unit for receiving quantum systems transmitted by transmitters/receivers communicating with the reception repeater and by transmission repeaters communicating with the reception repeater;
(c2) a measurement device for measuring the quantum systems received; and
(c3) a unit for transmitting measurement outcomes to transmitters/receivers and the transmission repeaters as transmission sources.

4. A quantum repeater network system for performing quantum communication between one transmitter/receiver and the other transmitter/receiver via transmission repeaters and reception repeaters, wherein a receiver of the transmitter/receiver includes:
(a1) a unit for receiving quantum systems transmitted by transmission repeaters communicating with the transmitter/receiver;
(a2) a measurement device for performing measurement for the received quantum systems; and
(a3) a unit for transmitting measurement outcomes to different transmitters/receivers, wherein each of transmission repeaters includes:
(b1) a unit for preparing quantum systems in an irreducibly entangled state, each of said quantum systems being associated with a transmitter/receiver or a reception repeater as a transmission destination;
(b2) a unit for transmitting quantum systems, which are respectively entangled with the quantum systems in the irreducibly entangled state, to the associated transmitters/receivers and the associated reception repeaters, respectively;
(b3) a measurement device for performing measurement on the quantum systems in the irreducibly entangled state, in accordance with measurement outcomes received from the transmitters/receivers and the reception repeaters as the transmission destinations; and
(b4) a unit for transmitting measurement outcomes to transmitters/receivers, and wherein each of reception repeaters includes:
(c1) a unit for receiving quantum systems transmitted by the transmission repeaters communicating with the reception repeater;
(c2) a measurement device for measuring the quantum systems received; and
(c3) a unit for transmitting measurement outcomes to the transmitters/receivers and the transmission repeaters as transmission sources.

5. A quantum repeater network system for performing quantum communication between one transmitter/receiver and the other transmitter/receiver via transmission repeaters and reception repeaters, wherein a transmitter of the transmitter/receiver includes:
(a1) a unit for transmitting parts of quantum systems to reception repeaters as transmission destinations; and
(a2) an operation unit for performing operations for a remaining part of the quantum systems based on measurement outcomes received from the reception repeaters as the transmission destinations, wherein each of transmission repeaters includes:
  (b1) a unit for preparing quantum systems in an irreducibly entangled state, each of said quantum systems being associated with a reception repeater as a transmission destination; and
  (b2) a unit for transmitting, to the associated reception repeater, each of the quantum systems in the irreducibly entangled state together with a quantum system entangle with the quantum system, and
wherein each of reception repeaters includes:
  (c1) a unit for receiving quantum systems transmitted by transmitters/receivers communicating with the reception repeater and by transmission repeaters communicating with the reception repeater;
  (c2) a measurement device for measuring the quantum systems received; and
  (c3) a unit for transmitting measurement outcomes to the transmitters/receivers.

6. A quantum repeater network system for performing quantum communication between one transmitter/receiver and the other transmitter/receiver via transmission repeaters and reception repeaters,
  wherein a receiver of the transmitter/receiver includes:
    (a1) a unit for receiving quantum systems transmitted by transmission repeaters communicating with the transmitter/receiver;
    (a2) a measurement device for performing measurement for one part or the whole of the received quantum systems;
    (a3) a unit for transmitting measurement outcomes to different transmitters/receivers; and
    (a4) an operation unit for performing operations for a remaining part of the quantum systems based on measurement outcomes received from the transmitters/receivers, the transmission repeaters and the reception repeaters,
  wherein each of transmission repeaters includes:
    (b1) a unit for preparing quantum systems in an irreducibly entangled state, each of said quantum systems being associated with a transmitter/receiver or a reception repeater as a transmission destination; and
    (b2) a unit for transmitting, to the associated transmitter/receiver or the associated reception repeater, each of the quantum systems in the irreducibly entangled state together with a quantum system entangled with the quantum system, and
  wherein each of reception repeaters includes:
    (c1) a unit for receiving quantum systems transmitted by transmission repeaters communicating with the reception repeater;
    (c2) a measurement device for measuring the quantum systems received; and
    (c3) a unit for transmitting measurement outcomes to transmitters/receivers.

7. A quantum repeater network system for performing quantum communication between one transmitter/receiver and the other transmitter/receiver via transmission repeaters and reception repeaters,
  wherein a transmitter of the transmitter/receiver includes:
    (a1) a unit for transmitting parts of quantum systems to reception repeaters as transmission destinations; and
    (a2) an operation unit for performing operations for a remaining part of the quantum systems based on measurement outcomes received from the transmission repeaters and the reception repeaters,
  wherein each of transmission repeaters includes:
    (b1) a unit for preparing quantum systems in an irreducibly entangled state, each of said quantum systems being associated with a reception repeater as a transmission destination;
    (b2) a unit for transmitting quantum systems, which are respectively entangled with the quantum systems in the irreducibly entangled state, to the associated reception repeaters, respectively;
    (b3) a measurement device for performing measurement on the quantum systems in the irreducibly entangled state, in accordance with measurement outcomes received from the reception repeaters as the transmission destinations; and
    (b4) a unit for transmitting measurement outcomes to transmitters/receivers, and
  wherein each of reception repeaters includes:
    (c1) a unit for receiving quantum systems transmitted by transmitters/receivers communicating with the reception repeater and by transmission repeaters communicating with the reception repeater;
    (c2) a measurement device for measuring the quantum systems received; and
    (c3) a unit for transmitting measurement outcomes to transmitters/receivers and the transmission repeaters as transmission sources.

8. A quantum repeater network system for performing quantum communication between one transmitter/receiver and the other transmitter/receiver via transmission repeaters and reception repeaters,
  wherein each of the transmitter/receiver includes:
    (a1) a unit for receiving quantum systems transmitted by transmission repeaters communicating with the transmitter/receiver;
    (a2) a measurement device for performing measurement for one part or the whole of the received quantum systems;
    (a3) a unit for transmitting measurement outcomes to different transmitters/receivers; and
    (a4) an operation unit for performing operations for a remaining part of the quantum systems based on measurement outcomes received from the transmitters/receivers, the transmission repeaters and the reception repeaters,
  wherein each of transmission repeaters includes:
    (b1) a unit for preparing quantum systems in an irreducibly entangled state, each of said quantum systems being associated with a transmitter/receiver or a reception repeater as a transmission destination; and
    (b2) a unit for transmitting quantum systems, which are respectively entangled with the quantum systems in the irreducibly entangled state, to the associated transmitters/receivers and the associated reception repeaters, respectively;
    (b3) a measurement device for performing measurement on the quantum systems in the irreducibly entangled state, in accordance with the measurement outcome received from the transmitters/receivers and the reception repeaters as the transmission destinations; and
    (b4) a unit for transmitting measurement outcomes to transmitters/receivers, and
  wherein each of reception repeaters includes:
    (c1) a unit for receiving quantum systems transmitted by the transmission repeaters communicating with the reception repeater;
    (c2) a measurement device for measuring the quantum systems received; and (c3) a unit for transmitting measurement outcomes to transmitters/receivers and the transmission repeaters as transmission sources.

* * * * *